3,322,831
PREPARATION OF α,β-UNSATURATED KETONES
Lawrence J. Hughes, Hitchcock, Tex., assignor to Monsanto Company, a corporation of Delaware
No Drawing. Filed Sept. 23, 1963, Ser. No. 310,891
8 Claims. (Cl. 260—590)

The present invention relates to a novel method for preparing unsaturated ketones. More particularly, it is concerned with a new and improved process for preparing α,β-unsaturated ketones from α-aryl olefins.

The more commonly employed methods for the preparation of unsaturated ketones include the standard condensation of aldehydes with ketones such as the aldol and Claisen condensations and dehydrohalogenation of halogenated ketones. However, these methods require expensive starting materials or intermediates and elaborate multi-step process operations.

It is an object of the present invention to provide a novel improved process for the production of unsaturated ketones in good yields in a technically simple manner employing relatively low cost starting materials. This and other objects and advantages of the invention which will become apparent from the following description are attained according to the process of the invention by reacting an α-aryl olefin with an acid anhydride in the presence of a salt of perchloric acid as a catalyst and recovering an α,β-unsaturated ketone from the reaction mixture.

The α-aryl olefins employed as reactants in the present process are those having at least one hydrogen atom on the β-carbon atom and include those wherein the olefinic group may be part of an alicyclic ring. As examples of such compounds which undergo the reaction, there may be mentioned styrene, α-methylstyrene, 1-phenylcyclopentene-1, 2-phenylbutene-1, 1-phenylpropene-1, 2-phenylbutene-2, 2-phenyl-3-methylbutene-2, 2-phenyl-3-methylpentene-2, 2-phenyl-3-ethylhexene-2, 1-phenylpentene-1, 2-phenylpentene-1, α-cyclohexylstyrene, 1-phenylcyclohexene, ortho-, meta- and para-methylstyrenes, ortho-, meta- and para-chlorostyrenes, ortho-, meta- and para-bromostyrenes, 2,3-dichlorostyrene, 2,4-dibromostyrene, 2,5-dichlorostyrene, 2,6-dichlorostyrene, 3,4-dibromostyrene, 3,5-dichlorostyrene, 2-phenylbutadiene-1,3, 1,1-diphenylethylene, ortho-, meta- and para-methoxystyrenes, ortho-, meta- and para-hydroxystyrenes, and the like.

Any acid anhydride of the formula

(RCO)$_2$O wherein R is an alkyl, cycloalkyl, alkenyl, aryl, aralkyl or alkaryl radical can be employed to react with the α-aryl olefin. Suitable compounds include acetic, propionic, butyric, pentanoic, benzoic or substituted benzoic anhydrides, crotonic anhydride, cyclopentane carboxylic acid anhydride, cyclohexane carboxylic acid anhydride, phenyl acetic anhydride, ortho-, meta- and para-toluic anhydrides, and the like. Mixtures of the anhydride and the corresponding carboxylic acid such as, for example, mixtures of acetic anhydride and acetic acid, can be employed if desired.

At least one mole of anhydride should be used per mole of α-aryl olefin. Preferably, however, the anhydride is employed in excess, say, from about 2 to about 10 moles of anhydride per mole of α-aryl olefin.

The catalyst employed in the reaction is a salt of perchloric acid which is soluble in the anhydride reactant. Those salts which are generally useful include the alkali metal and alkaline earth metal salts such as sodium perchlorate, potassium perchlorate, lithium perchlorate, rubidium perchlorate, cesium perchlorate, magnesium perchlorate, barium perchlorate, calcium perchlorate, and strontium perchlorate with the alkali metal salts, particularly lithium perchlorate, being preferred. The amount of catalyst may vary from about 0.1% to about 10% by weight of the reaction mixture. Preferably, an amount of catalyst from about 0.5% to about 2% is used.

The process is carried out by charging the reactants and the catalyst to a suitable reaction vessel or kettle and heating the mixture gently to effect refluxing. The reaction can be conducted at temperatures ranging from 100° to 150° C. However, the preferred temperatures are generally those from about 120° to about 140° C. The time required for completion of the reaction may vary from about 1 to about 10 hours depending upon the temperature employed. At least one hour is required for practical yields and preferably the reaction is carried out over a period of about three hours.

The process is preferably conducted at atmospheric pressure although there is no disadvantage in the use of subatmospheric or superatmospheric pressures.

The α,β-unsaturated ketone can be recovered by any suitable means. One way of recovering the ketone is to add aqueous caustic to the reaction mixture in an amount sufficient to effect hydrolysis of the unreacted anhydride and neutralize the acid present. The ketone product is then readily extracted from the neutral mixture with a solvent such as benzene, ether, chloroform, etc., and the extract is fractionally distilled to obtain the ketone in purified form.

The invention is illustrated in the following examples which, however, are not to be considered as limiting it in any manner whatsoever.

*Example 1*

About 2.2 g. (0.02 mole) of lithium perchlorate was dissolved in a mixture of 51 g. (0.5 mole) of acetic anhydride and 20 ml. of acetic acid and charged to a flask equipped with a stirrer, a thermometer, and a reflux condenser. To this mixture was added 54 g. (0.46 mole) of α-methylstyrene. The resulting mixture was heated to its refluxing temperature and the heating continued for a period of 3¼ hours. During this reaction period, the temperature of the reaction mixture was about 134° C.

At the end of the reaction period, the reaction mixture was poured onto 500 cc. of ice. The resulting mixture was made alkaline with 50% NaOH. The organic and aqueous layers were then separated and the aqueous layer was extracted with two 50-cc. portions of benzene. The benzene extracts were combined with the organic oil, washed with an equal volume of water, and dried over sodium sulfate. The benzene was stripped off and the residue was distilled under vacuum (0.5 to 0.25 mm.) through an 0.8 x 15 cm. Vigreaux column to yield a total of 17.1 g. of 4-phenylpent-3-ene-2-one boiling over a range between 74° C. and 84° C. at 0.4 mm. Hg and 84° C. and 104° C. at 0.3 mm. Hg, respectively. The product was identified by comparison with similar fractions upon which positive identification had been made by means of the infrared spectrum and the 2,4-dinitrophenylhydrazone derivative of this ketone (M.P. 173–4° C. as compared with literature value of 174–5° C.). Further positive identification of the reaction product was made by its oxidation to benzoic acid with alkaline KMnO$_4$. The resulting white crystalling product recrystallized from water had a melting point of 122° C. as compared to the literature value of 122.7° C. for benzoic acid.

*Example 2*

The experiment of Example 1 was repeated using 59 g. (0.5 mole) of α-methylstyrene, 51 g. (0.5 mole) of acetic anhydride, 20 ml. of acetic acid, and 5.3 g. (0.05 mole) of lithium perchlorate. A yield of 4-phenylpent-3-ene-2-one of 24% was obtained.

Example 3

A run following the procedure of Example 1 but using a mole ratio of α-methylstyrene to acetic anhydride of 1:2 with 20 ml. of acetic acid and 5.3 g. (0.05 mole) of lithium perchlorate catalyst resulted in a yield of 4-phenylpent-3-ene-2-one of 33.1%.

Example 4

The experiment of Example 3 was repeated but with no acetic acid present. The yeild of 4-phenylpent-3-ene-2-one in this instance was 40.3%.

Example 5

The experiment of Example 3 was again repeated except that the amount of acetic anhydride was increased so that the mole ratio of α-methylstyrene to acetic anhydride was 1:4 and the amount of lithium perchlorate catalyst used in the reaction was doubled (10.6 g. or 0.1 mole). The yield of 4-phenylpent-3-ene-2-one obtained was 40.4%.

Example 6

In this run, 59 g. (0.5 mole) of α-methylstyrene, 102 g. (1.0 mole) of acetic anhydride, and 2.65 g. (0.025 mole) of lithium perchlorate were mixed and added slowly to a refluxing solution of 2.65 g. (0.025 mole) of lithium perchlorate in 102 g. (1.0 mole) of acetic anhydride over a period of about two hours. The mixture was refluxed for another two-hour period after which the 4-phenylpent-3-ene-2-one was recovered in the manner described in Example 1. The yield of this product obtained was 45.3%.

Example 7

Following the procedure of Example 1, 59 g. (0.5 mole) of α-methylstyrene and 120.1 g. (1.0 mole) of propionic anhydride were heated in the presence of 5.3 g. (0.05 mole) of lithium perchlorate for a period of about four hours at a temperature of about 135–140° C. The product 5-phenylhex-4-ene-3-one was obtained in a yield of 43.3%.

Example 8

Following a procedure substantially the same as that of Example 1, the compound, 2-phenylhept-2-ene-4-one, was obtained in a yield of approximately 40% by reacting 59 g. (0.5 mole) of α-methylstyrene with 158 g. (1.0 mole) of n-butyric anhydride in the presence of 5.3 g. (0.05 mole) of lithium perchlorate at a temperature of about 135–7° C. over a period of about four hours.

Example 9

Styrene (20.8 g.–0.2 mole) was reacted with 100 ml. (1.1 mole) of acetic anhydride in the presence of 5.3 g. (0.05 mole) of lithium perchlorate and 100 ml. of acetic acid. After a refluxing period (temperature 125° C. to 130° C.) of about three hours, the reaction mixture was treated as in Example 1 to recover 5.1 g. of a product which solidified at room temperature and which was identified by means of its infrared spectrum and 2-dinitrophenylhydrazone derivative as 4-phenylbut-3-ene-2-one (benzal acetone).

Example 10

About 5.3 g. (0.05 mole) of lithium perchlorate was dissolved in 102 g. (1.0 mole) of acetic anhydride. To this mixture contained in a reaction flask equipped with a stirrer, thermometer, and reflux condenser was added 36 g. (0.25 mole) of 1-phenylcyclopentene-1 and the whole was heated to refluxing temperature. The reaction mixture was refluxed for a period of about three hours at a temperature in the range from 139° to 142° C. after which it was cooled and treated as in Example 1 with aqueous caustic followed by extraction and distillation to give 2-aceto-1-phenylcyclopentene-1 in 71% yield. The product was identified by determination of its molecular weight (191 as compared to the theoretical of 186) and infrared and ultraviolet spectra.

What is claimed is:

1. A process for producing an α,β-unsaturated ketone which comprises reacting an α-phenyl olefin selected from the group consisting of styrene, α-methylstyrene and 1-phenylcyclopentene-1 with an acid anhydride of the formula $$(RCO)_2O$$

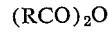

wherein R is an alkyl group in the presence of a salt of perchloric acid selected from the group consisting of the alkali metal and alkaline earth metal salts and recovering an α,β-unsaturated ketone from the reaction mixture.

2. A process for producing an α,β-unsaturated ketone which comprises heating together under refluxing conditions at least equimolecular proportions of an α-phenyl olefin selected from the group consisting of styrene, α-methylstyrene and 1-phenylcyclopentene-1 and an acid anhydride of the formula $$(RCO)_2O$$

wherein R is an alkyl group in the presence of from about 0.1% to about 10% by weight of the reaction mixture of a salt of perchloric acid selected from the group consisting of the alkali metal and alkaline earth metal salts and recovering an α,β-unsaturated ketone from the reaction mixture.

3. A process for producing an α,β-unsaturated ketone which comprises heating together under refluxing conditions at least equimolecular proportions of an α-phenyl olefin selected from the group consisting of styrene, α-methylstyrene and 1-phenylcyclopentene-1 and an acid anhydride of the formula $$(RCO)_2O$$

wherein R is an alkyl group in the presence of from about 0.1% to about 10% by weight of the reaction mixture of an alkali metal salt of perchloric acid and recovering an α,β-unsaturated ketone from the reaction mixture.

4. A process for the preparation of 4-phenylpent-3-ene-2-one which comprises heating under refluxing conditions α-methylstyrene and acetic anhydride in proportions such that at least one mole of anhydride is employed per mole of α-methylstyrene in the presence of an amount of lithium perchlorate in the range from about 0.5% to about 2% by weight of the reaction mixture and recovering 4-phenylpent-3-ene-2-one from the reaction mixture.

5. A process for the preparation of 5-phenylhex-4-ene-3-one which comprises heating under refluxing conditions α-methylstyrene and propionic anhydride in proportions such that at least one mole of anhydride is employed per mole of α-methylstrene in the presence of an amount of lithium perchlorate in the range from about 0.5% to about 2% by weight of the reaction mixture and recovering 5-phenylhex-4-ene-3-one from the reaction mixture.

6. A process for the preparation of 2-phenylhept-2-ene-4-one which comprises heating under refluxing conditions α-methylstyrene and butyric anhydride in proportions such that at least one mole of anhydride is employed per mole of α-methylstyrene in the presence of an amount of lithium perchlorate in the range from about 0.5% to about 2% by weight of the reaction mixture and recovering 2-phenylhept-2-ene-4-one from the reaction mixture.

7. A process for the preparation of 4-phenylbut-3-ene-2-one which comprises heating under refluxing conditions styrene and acetic anhydride in proportions such that at least one mole of anhydride is employed per mole of styrene in the presence of an amount of lithium perchlorate in the range from about 0.5% to about 2% by weight of the reaction mixture and recovering 4-phenylbut-3-ene-2-one from the reaction mixture.

8. A process for the preparation of 2-aceto-1-phenylcyclopentene-1 which comprises heating under refluxing conditions 1-phenylcyclopentene-1 and acetic anhydride in proportions such that at least one mole of anhydride is employed per mole of 1-phenylcyclopentene-1 in the presence of an amount of lithium perchlorate in the range from about 0.5% to about 2% by weight of the reaction mixture and recovering 2-aceto-1-phenylcyclopentene-1 from the reaction mixture.

References Cited

Rozenberg et al.: Zh. Obshch. Khim, 32, 3417–3430 (1962), cited in Chem. Abstracts, 58, 13861h (1964).

LEON ZITVER, *Primary Examiner.*
D. D. HORWITZ, *Examiner.*